United States Patent [19]
Bainton

[11] 3,953,222
[45] Apr. 27, 1976

[54] ADDITION OF ACIDULATED POZZOLAN TO CONCRETE AND CONCRETE PRODUCTS

[75] Inventor: John W. Bainton, Nassau, Bahamas

[73] Assignee: Tekology Corporation, Palisades Park, N.J.

[22] Filed: Apr. 10, 1974

[21] Appl. No.: 459,587

[52] U.S. Cl. .................................. 106/97; 106/98; 106/117; 106/120
[51] Int. Cl.² .......................................... C04B 7/02
[58] Field of Search .................. 106/98, 97, DIG. 1, 106/117, 120

[56] References Cited
UNITED STATES PATENTS

| | | | |
|---|---|---|---|
| 1,873,642 | 8/1932 | Guertler | 106/DIG. 1 |
| 2,698,251 | 12/1954 | Shea et al. | 106/98 |
| 2,698,256 | 12/1954 | Shea et al. | 106/314 |

*Primary Examiner*—J. Poer
*Attorney, Agent, or Firm*—Dowell & Dowell

[57] ABSTRACT

The method of making concrete products, and the resulting products, in which pozzolans are added to the concrete or substituted for some of the Portland Cement therein after the pozzolan has been acidulated by treatment with a strong mineral acid selected to convert non-siliceous metallic oxides therein into other salts which can be separated out, leaving $SiO_2$ spheres whose surfaces are cleaned and pock-marked to provide greater active surface area, thereby increasing the pozzolanic activity. Acids are chosen so that an unwashed acidulated pozzolan can remain wet for example, either with chlorides as accelerators, or with sulphates as retarders when added to the cement mix.

16 Claims, No Drawings

ADDITION OF ACIDULATED POZZOLAN TO CONCRETE AND CONCRETE PRODUCTS

FIELD OF INVENTION

This invention relates to improvements in methods of manufacturing poured, molded, or pressed concrete products such as concrete blocks or bricks, and to the improved products themselves, resulting from the addition of pre-acidulated pozzolans to the concrete mix to provide a product which is very much stronger and more stable that the same product would be if made using the same pozzolan, but unacidulated.

BACKGROUND

When Portland Cement hydrates calcium silicates and the calcium aluminates crystalize with the water and form the crystals which provide the desired strength of the end product. The reaction liberates a certain amount of free line as calcium hydroxide, and this amount of free lime generally falls somewhere between 12 and 18 percent of the Portland Cement. The reason for the variation is that there is variation in the raw materials used at any particular mill which results in the manufacture of higher or lower calcium content.

This free lime is usually deleterious to a finished mortar or concrete volume for a number of reasons which have been well described in the literature as resulting in unsoundness, and/or because the lime leaches to the surface and causes efflorescence. Not all of the deleterious effects of free lime are considered deleterious in all forms of concrete. For example, resistance to sulphate attack is very important for a sewer pipe but usually not for a cement block, while efflorescence is not a problem in sewer pipes but can be a real problem in cement block. Nevertheless, the removal of some or most of the free lime, as free lime, is almost never undesirable and almost always desirable if not vital to the quality of the final product. The literature describes many additives which will combine with the free lime to form insoluble salts. Two of these also add cementitious values which means that the Portland Cement which must be introduced into the mix can be reduced somewhat for equal strength. One of these is the addition of some finely ground siliceous material such as silica flour, but if it has not been calcined, no reaction will occur between it and the free lime unless the product is subsequently autoclaved at high temperature and high steam pressure, i.e. treated under hydrothermal conditions. However, if the siliceous material is pozzolanic i.e., of volcanic origin, or fly ash, or the ash from which shale oil has been extracted, or some other siliceous or argillaceous material, then reaction will occur between the lime and the pozzolan over a period of time at ambient temperature, which reaction will cause the formation of calcium silicates which will not only eliminate much of the deleterious free lime but in addition will add cementitious strength.

This enables a pozzolan to replace a part of the more expensive Portland Cement at no sacrifice in eventual strength of seasoned concrete, and due to the lowered free lime content in some circumstances the concrete quality will actually be improved with regard to some characteristics. Pozzolans have been used as an ingredient in concrete and masonry products since the Romans, and since they can be taken from different sources they can differ in their chemical and physical characteristics and therefore vary in their performance as pozzolans.

Fly ash is usually an extremely effective pozzolan but this depends somewhat upon its source. Moreover, fly ash is a most economically desirable pozzolan in the United States because it is not only a waste product but also a pollutant. In addition, fly ash almost always possesses additional advantages, due to its particle size and shape, which are not normally associated with other pozzolan.

THE PRIOR ART

The prior art teaches the addition of many additives to concrete. These include sulphates as retarders, chlorides as accelerators, and pozzolans, but not acidulated pozzolans in general or acidulated fly ash in particular. U.S. Pat. No. 1,873,642 to Guertler is concerned with the recovery of alumina from fly ash by treatment of the ash with strong mineral acids to convert oxides of other metals into soluble salts that can be separated, and this patent states that essentially iron-free silica will remain after such acid treatment and separation, and that this residue of silica forms an improved raw material for cement and chemical manufacture, and that by incomplete extraction of alumina, one can leave a portion of the bases in the siliceous material in order that the residue may be utilized for cement manufacture. The discussion in this patent is concerned with the manufacture of cement, not with the treating of pozzolan additives for concrete. In manufacturing cement untreated fly ash normally is found to have too high an iron and/or aluminum content. Therefore Guertler is recognizing that, incident to his recovery of aluminum, he can remove the excess iron or aluminum and leave silica which can be used as a part of the raw material for making Portland Cement with the addition of sufficient calcareous material, followed by appropriate grinding, calcining, and mixture with other chemical additives.

Acidulation of fly ash is also known in the sewage treatment art as evidenced by U.S. Pat. No. 3,388,060 to Clark.

U.S. Pat. No. 2,900,265 to Klein shows the acid treatment of concentrated Steffen Filtrate (C.S.F.) which is then added to cementitious mixtures along with fly ash, but in this teaching the hydrochloric acid is added for the hydrolysis treatment of the C.S.F. rather than for treatment of fly ash for use as a pozzolan.

U.S. Pat. Nos. 3,769,053 and 3,769,054 to Pennachetti are more typical of the prior art with regard to the mechanical separation of the various fly ash constituents to recover valuable products including a fraction with pozzolanic properties.

THE INVENTION

This invention is based upon the discovery that acidulation of a pozzolan generally, and fly ash specifically, by using a selected mineral acid or a combination thereof, greatly improves their pozzolanic properties useful for subsequent addition to concrete or mortar mixes with or without grinding or calcining. Moreover, this greatly improved performance is in addition to the improvement achieved by the addition of other well established admixtures. The degree of improvement is unexpectedly great and, once this fact is realized, the improvement can be logically explained and attributed to several different effects. As will be illustrated in the examples set forth below, the improvement in the strength of concrete structures resulting from the addition of acidulated pozzolan can exceed by more than 100 percent the strength of the same products or structures made with identical materials except that the pozzolans were not acidulated. The invention teaches the treatment of the pozzolan by strong mineral acid prior to the time that it is incorporated in the concrete mix. Basically, fly ash itself is glass particles ranging anywhere from one micron to perhaps 100 microns in size. They average about 40 microns, and they are in the form of hollow spheres made up of a lattice work of $SiO_2$ molecules that have, interspersed between them, the oxides of various other metallic elements that were present in the fuel burned to produce the ash. These would be principally oxides of calcium, magnesium, aluminum, and iron. The exact makeup would depend upon the source of the fuel and the burning conditions. When this fly ash is treated with a suitable strong mineral acid it becomes possible to remove these oxides from the $SiO_2$ lattice since they form other salts which can be washed out, but in addition their removal leaves the silica glass spheres pock-marked, as can be seen in pictures made with a scanning electron microscope which demonstrate the surface roughening very clearly.

Now, when such acidulated pozzolan is added to cement and aggregate to form concrete, the chemical reaction that results is the same as it would be if an unacidulated pozzolan had been used. However, this action is much, much more rapid and much more complete than it is with unacidulated pozzolan. This improvement results from the creation of a great deal more surface area on the glass spheres which now include evacuated pockets, or so-called hot spots, in the spheres which comprise exposed clean surfaces that are very active in their chemical combination with the lime which may have been added to the mix and/or with free lime liberated by the hydration of Portland Cement.

It is a major object of this invention to provide improved and less expensive concrete and masonry products containing acidulated pozzolans, which products are improved to the extent that the lime liberated during hardening has adequate, quickly-available, $SiO_2$ with which to react rapidly. Since usually the acidulation of the pozzolan requires time and separation of excess acid, the acid treatment must be done before the pozzolan is added to the concrete mix, i.e., the acid and the untreated pozzolan cannot be added together to the concrete mix.

Another object of this invention is to provide a more concentrated pozzolan. In some instances, the use of unacidulated pozzolans may be restricted because their physical properties may be such that their usefulness is limited or negated.

It is another object of this invention to provide an improved process including the adding of acidulated pozzolanic material to concrete products to make the calcium silicate reaction more rapid and complete due partly to the increased specific surface of the pozzolan as a result of its acidulation prior to adding it to the concrete. The pock-marked spheres resulting from acidulation of, for example, fly ash, cause an accelerated $CaO-SiO_2$ bonding reaction which is more complete at every stage in the hardening process.

As stated above, pozzolans have been used as ingredients in concrete and masonry products for some time because they can replace a part of the more expensive Portland Cement (about 25 percent) at a sacrifice of some "early," but properly proportioned, no "eventual" strength. The acidulation taught according to this invention overcomes the loss of early strength which the addition of pozzolans to a mix usually causes. The advantages of utilizing acidulated pozzolans are not, however, limited to improvement in compressive strength. Other engineering properties are improved as a result of using pozzolans, and acidulation will further enhance this improvement, particularly with regard to resistance to acid attach and lower efflorescence. These improvements are realized for concretes ranging from sand mixes which resemble a mortar through mixes in which coarse aggregate is of substantial size, for instance averaging 3 inches.

Testing of pressed concrete products to determine the degree of improvement has been done with calcareous aggregate materials in the concrete mix; it has been done with a siliceous sand; it has been done with siliceous aggregate like granite and sandstone; it has been done with products that have been subsequently atmospherically cured; it has been done with products that have been subsequently autoclaved at high temperature and high pressure; and it has been done where the curing has been accelerated by the use of steam, etc.; and in each instance the performance of the pozzolan has been greatly improved by acidulation thereof.

Still another object of this invention is to acidulate the fly ash prior to mixing it with the concrete using a carefully selected acid. For instance, it is well known that properly-dosed calcium chloride and other chlorides are common accellerators and that calcium sulphate is a retarder. For optimum final strength the optimum amount of calcium sulphate depends upon curing conditions. Thus if acidulation is accomplished using sulphuric acid, or using hydrochloric acid in proper amounts to achieve a desired retarding or accelerating effect, then there is no need to wash the fly ash thoroughly to remove the last remnants of the acid and of the salts formed. Other mineral acids, such as hydrofluoric acid and nitric acid, can also be used to accomplish the acidulation, but some may require more thorough washing of the pozzolan after acidulation than hydrochloric and sulphuric acids. Where it is desired to have the concrete retarded, one should use the sulphate ion, which raises an interesting consideration. Cement as it is made at the mill is essentially a standard cement good for all uses. When manufacturing a steam cured product, it is commonly known that the product is improved by including more sulphate ions than are normally put in cement, and, of course, these can be supplied by using fly ash which has been acidulated by the addition of sulphuric acid. This idea can be further extended to the case in which small concrete products such as block and brick are being made where in lieu of ground Portland Cement one adds unground Portland Cement clinker, i.e., calcined clinker. The use of unground clinker has an excellent economic advantage because before it is ground, clinker can be stored more easily and economically since it won't set up, and it is much cheaper to ship and to handle. Another important advantage thereof stems from the fact that much of the cost of Portland Cement is the cost of grinding the clinker. Portland Cement is very hard and abrasive, and therefore grinding of clinker is very expensive and consumes an enormous amount of energy. However, it is possible to use the calcined cement clinker in a high energy mixer along with acidulated fly ash, so that in effect the clinker is ground wet, and wet grinding the clinker is very much cheaper than dry grinding. In a cement mill, it is not possible to grind the cement clinker (with water) because it would set up and hydrate. However, it can be so ground prior to molding a product, and if unwashed acidulated pozzolan is in the mix there will be enough retardation to provide ample time in which to mold and press the desired end product. Thus, it is not necessary to grind the clinker by the more expensive dry method.

As it well known in the prior art, there are a number of different settable ingredients or materials which are in common use to make cementitions products or structures. For instance, aside from Portland Cement, there are various other hydraulic cements, "natural" cements; and there are other materials which under proper conditions will set, i.e., including Portland Cement clinker, water-quenched blast furnace slag, lime, etc.

EXAMPLES

The following examples illustrate the process of the invention and show, inter alia, the advantage gained by acidulating pozzolans before adding them to certain products, as compared with adding unacidulated pozzolans, or adding no pozzolans at all, other factors being the same.

EXAMPLE 1

Pressed concrete cubes were made and air-cured at ambient temperature, certain of the cubes containing a pozzolan comprising fly ash acidulated with hydrochloric acid and then drained but not washed prior to inclusion in the mix, and others of the cubes containing untreated fly ash, and still others of the cubes comprising control cubes containing no fly ash but otherwise made at the same time with identical ingredients and aged under the same conditions. The ingredients in the cubes are as follows, by weight of the dry mix:

|  | CONTROL CUBES | UNACIDULATED ASH CUBES | ACIDULATED ASH CUBES |
|---|---|---|---|
| Portland Cement | 10% | 10% | 10% |
| Sand & Fine Aggregate | 90% | 80% | 80% |
| Water | 8% | 8% | 8% |
| Fly Ash Untreated | — | 10% | — |
| Acidulated Fly Ash | — | — | 10% |
| Measured Compressive Strength (24 SAMPLES after 3 days, shown on a relative scale where the control sample's strength is adjusted to equal 100.) | 100 | 120 | 229 |

EXAMPLE 2

This example is similar to EXAMPLE 1 with two exceptions, i.e., that the fly ash was acidulated with sulphpuric acid (unwashed), and that the cubes were cured at a temperature elevated somewhat above ambient (140°F) for 16 hours:

|  | CONTROL CUBES | UNACIDULATED ASH CUBES | ACIDULATED ASH CUBES |
|---|---|---|---|
| MEASURED COMPRESSIVE STRENGTH (24 samples after 48 hours) | 100 | 177 | 324 |

The fact that the differential in compressive strength appears greater in EXAMPLE 2 than in EXAMPLE 1 is attributable to the use of an elevated curing temperature which always increases the pozzolanic activity both with and without acidulation. Moreover, it is well known that a sulphate improves steam curing, and in EXAMPLE 2 the treated pozzolan was not washed to remove the sulphate after the ash was drained. If the pozzolan had been washed before adding it to the mix, the relative strength figure of 324 would have been decreased.

EXAMPLE 3

The example is similar to EXAMPLE 1 with two exceptions, i.e., that the fly ash was thoroughly washed to remove remaining soluble salts and acid before adding the fly ash to the mix, and that the resulting cubes were autoclaved at 350°F for 8 hours.

|  | CONTROL CUBES | UNACIDULATED ASH CUBES | ACIDULATED ASH CUBES |
|---|---|---|---|
| MEASURED COMPRESSIVE STRENGTH (12 samples) | 100 | 245 | 303 |

The showing of EXAMPLE 3 emphasizes the fact that autoclaving and acidulation of the pozzolan tend to provide similar benefits. Thus, the unacidulated figure of 245 is approaching the acidulated figure of 303, and if the autoclaving were continued for a longer time the differential between the two would be reduced still further. However, autoclaving is expensive since it uses energy at a high rate.

EXAMPLE 4

This example is similar to EXAMPLE 1 except that the fly ash was thoroughly washed to remove remaining soluble salts and acid before adding the fly ash to the mix, which was then air cured at ambient temperature. Note that the pozzolan was acidulated in both the second and third columns, but that the proportion of cement used therein has been changed. The control samples in this example also contain fly ash (unacidulated):

|  | UNACIDULATED ASH CONTROL | ACIDULATED ASH CUBE | ACIDULATED ASH CUBE |
|---|---|---|---|
| Portland Cement | 10% | 5% | 10% |
| Aggregate (3/16" or less from Georgia granite crushing plant) | 80% | 85% | 80% |
| Acidulated Fly Ash | — | 10% | 10% |
| Unacidulated Fly Ash | 10% | — | — |
| Water | 8% | 8% | 8% |
| Measured Compressive Strength (36 samples after 28 days) | 100 | 139 | 149 |

Note: Since the Fly Ash was washed, it really does not matter which acid was used to activate it as long as the resulting metallic salts are soluble. The small spread between the 139 figure of strength and the 149 figure demonstrate the economic advantage of acidulation which permits a 50% reduction in the Portland Cement used in the mix.

EXAMPLE 5

This example is similar to EXAMPLE 4 except that the aggregate was from a different source (not deemed significant), and the curing time was only 7 days instead of 28 days:

|  | UNACIDULATED ASH CONTROL | ACIDULATED ASH CUBE | ACIDULATED ASH CUBE |
|---|---|---|---|
| Measured Compressive Strength (36 samples after 7 days) | 100 | 114 | 147 |

Examples 4 and 5 when considered together show that the early strength of a cube is better with the higher percentage by weight of Portland Cement in the mix, but that the eventual strength is affected to a much lesser degree where an acidulated pozzolan is present.

EXAMPLE 6

This example shows that where an acidulated pozzolan is included in the mix, the Portland Cement can be entirely replaced with Portland Cement Clinker with some improvement in compressive strength. In this case the fly ash was acidulated with sulphuric acid and was drained but not washed, since the presence of the sulphate is recognized as helpful in retarding the setting rate of the clinker:

|  | CONTROL CUBE | ACIDULATED ASH CUBE |
|---|---|---|
| Portland Cement | 10% | — |
| Portland Cement Clinker | — | 10% |
| Aggregate (as in Example No. 1) | 80% | 80% |
| Acidulated Fly Ash | — | 10% |
| Unacidulated Fly Ash | 10% | — |
| Water | 8% | 8% |
| Compressive Strength (4 samples after 7 days) | 100 | 108 |

EXAMPLE 7

This example is intended to show that the reaction which is improved by acidulation of the pozzolan involves the reaction between the pozzolan and the lime in the concrete. Therefore, this example uses hydrated lime instead of cement in the mix, and a limestone aggregate has been selected since there can be no question of any reaction between it and the hydrated lime.

|  | UNACIDULATED CONTROL | ACIDULATED ASH CUBE |
|---|---|---|
| Hydrated Lime | 10% | 10% |
| Limestone Aggregate | 80% | 80% |
| Acidulated Fly Ash (washed) | — | 10% |
| Unacidulated Fly Ash | 10% | — |
| Water | 8% | 8% |
| Compressive Strength (after 28 days) | 100 | 171 |

EXAMPLE 8

This is the same as EXAMPLE 7 except instead of being cured at ambient temperature, this example included curing for 16 hours at 140°F.

|  | UNACIDULATED CONTROL | ACIDULATED ASH CUBE |
|---|---|---|
| Compressive Strength (after 48 hours) | 100 | 219 |

EXAMPLE 9

This is the same as EXAMPLE 7 except instead of being cured at ambient temperature, this example included autoclaving for 8 hours at 350°F.

|  | UNACIDULATED CONTROL | ACIDULATED ASH CUBE |
|---|---|---|
| Compressive Strength (after 24 hours) | 100 | 119 |

EXAMPLE 10

This example compares control cubes containing unacidulated fly ash which were autoclaved for 8 hours at 350°F with test cubes containing washed acidulated fly ash but unautoclaved, and cured at ambient temperature for 28 days.

|  | AUTOCLAVED UNACIDULATED CONTROL | UNAUTOCLAVED ACIDULATED CUBES |
|---|---|---|
| Compressive Strength (after 28 days) | 100 | 96 |

The significance of EXAMPLES 7, 8, 9, and 10 when mutually compared is that the acidulation of a pozzolan has the effect of increasing its pozzolanic activity, so that as shown in EXAMPLES 7 and 8 the strength of the cubes including an acidulated pozzolan is greatly improved over the control cubes. EXAMPLE 9 shows that with autoclaving there is some improvement realized from acidulating the pozzolan, although the improvement is modest. EXAMPLE 10 shows that autoclaved cubes in which the pozzolan is unacidulated have greater strength than cubes which are not autoclaved, but that where unautoclaved cubes contain an acidulated pozzolan and are allowed to ambient-cure to maturity, there is very little difference.

EXAMPLE 11

This example is concerned with the degree of efflorescence which occurs as a result of free lime remaining in the concrete, which lime has not been taken up by pozzolanic action. In this example four different series of test cubes were made, each comprising a pressed article air cured at ambient temperature. The control cubes contained no pozzolan; the Test No. 1 cubes contained unacidulated fly ash; the test No. 2 cubes contained acidulated fly ash; and the Test No. 3 cubes contained acidulated fly ash but a lesser amount of Portland Cement as shown. Aggregate was used to complete the proportion. The cubes were otherwise made with the same ingredients and under the same conditions, and 1 percent red iron oxide was added to make efforescence show up visually, since the lime is white. The degrees of efflorescence are rated according to standard ASTM terms.

|  | CONTROL | TEST NO. 1 | TEST NO. 2 | TEST NO. 3 |
|---|---|---|---|---|
| Portland Cement | 10% | 10% | 10% | 5% |
| Unacidulated Fly Ash | — | 10% | — | — |
| HCL Acidulated Fly Ash(washed) | — | — | 10% | 10% |
| Aggregate (crushed granite) | 89% | 79% | 79% | 84% |
| Red Iron Oxide | 1% | 1% | 1% | 1% |
| Water | 6% | 6% | 6% | 6% |
| Some Discoloration |  |  |  | * |
| Sharp Discoloration |  |  | * |  |
| Discoloration with Efflorescence |  | * |  |  |
| Efflorescence | * |  |  |  |

In the above tests fly ash was used in the pozzolan because it is the pozzolan of principal commercial interest, but other natural or man-made pozzolans provide similar relative test results when substituted for the fly ash.

The inventive process and products for which protection is claimed as set forth within the scope of the following claims.

I claim:

1. The method of making cementitious structures including the steps of treating pozzolanic material particles of the type comprising a lattice work of silicon dioxide molecules having interspersed between them metallic oxides, the treating employing a mineral acid in sufficient quantity to convert said metallic oxides into soluble salts of the mineral acid, separating most of the salts and any excess acids from the treated pozzolanic material, mixing the treated material with a settable concrete mix including aggregate and water, and molding said mix and allowing it to set to form said structure.

2. The method as set forth in claim 1, wherein the quantity of treated pozzolanic material added to the mix is within the range of 10 to 200 percent by weight of the weight of the included settable concrete ingredient.

3. The method as set forth in claim 1, wherein the mineral acid comprises one or more acids selected from a group consisting of hydrochloric, sulphuric, nitric, and hydrofluoric acids.

4. The method as set forth in claim 1, wherein the treated pozzolanic material is washed with water prior to its inclusion in the concrete mix.

5. The method as set forth in claim 1, wherein the acid is hydrochloric acid, and wherein after most of the acid and said salts are separated from the treated pozzolanic material, said treated material while still wet with the acid is mixed with the concrete mix thereby supplying chloride ions to the mix as a hardening accelerator.

6. The method as set forth in claim 1, wherein the acid is sulphuric acid, and wherein after most of said acid and said salts are separated from the treated pozzolanic material, said treated material while still wet with the acid is mixed with the concrete mix thereby supplying sulphate ions to the mix as a hardening retarder.

7. The method as set forth in claim 1, wherein the acid is hydrofluoric acid, and wherein after most of said acid and said salts are separated from the treated pozzolanic material, said treated material while still wet with the acid mixed with the concrete mix thereby supplying fluoride ions to the mix as a hardening retarder.

8. The mthod as set forth in claim 1, wherein said settable mix comprises one or more selected from a group of settable ingredients consisting of Portland Cement, natural cement, water quenched blast furnace slag, and lime.

9. The method as set forth in claim 1, wherein said pozzolanic material is fly ash.

10. The method as set forth in claim 1, wherein at least part of the settable mix comprises calcined cement clinker, and wherein the acid is sulphuric acid, and wherein after most of the said acid and salts are separated from the treated pozzolanic material, said treated material while still wet with the acid is mixed with the clinker and wet-ground and then mixed with said mix.

11. A cementitious product comprising a hardened concrete mix including a settable material, water, aggregate, and a pozzolanic material whose original surfaces are of the type comprising a lattic work of silicon dioxide molecules having interspersed between them metallic oxides, said surfaces having been pock-marked and pozzolanically activated and cleaned by removing non-siliceous metal oxide deposits therefrom.

12. The cementitious product as set forth in claim 11, including as said pozzolanic material fly ash treated with hydrochloric acid, and includng in the mix chloride ions remaining from the acid.

13. The cementitious product as set forth in claim 11, including as said pozzolanic material fly ash treated with sulphuric acid, and including in the mix sulphate ions remaining from the acid.

14. The cementitious product as set forth in claim 13, wherein the settable material includes cement clinker.

15. The cementitious product as set forth in claim 11, wherein the quantity by weight of treated pozzolanic material is within the range of 10 to 200 percent by weight of the weight of the included settable material.

16. The cementitious product as set forth in claim 11, wherein said settable material comprises one or more selected from a group consisting of Portland Cement, natural cement, water quenched blast furnace slag, and lime.

* * * * *